Dec. 20, 1927.
K. E. LYMAN
1,653,112
SHAFT SUPPORT
Filed May 5, 1927    3 Sheets-Sheet 1
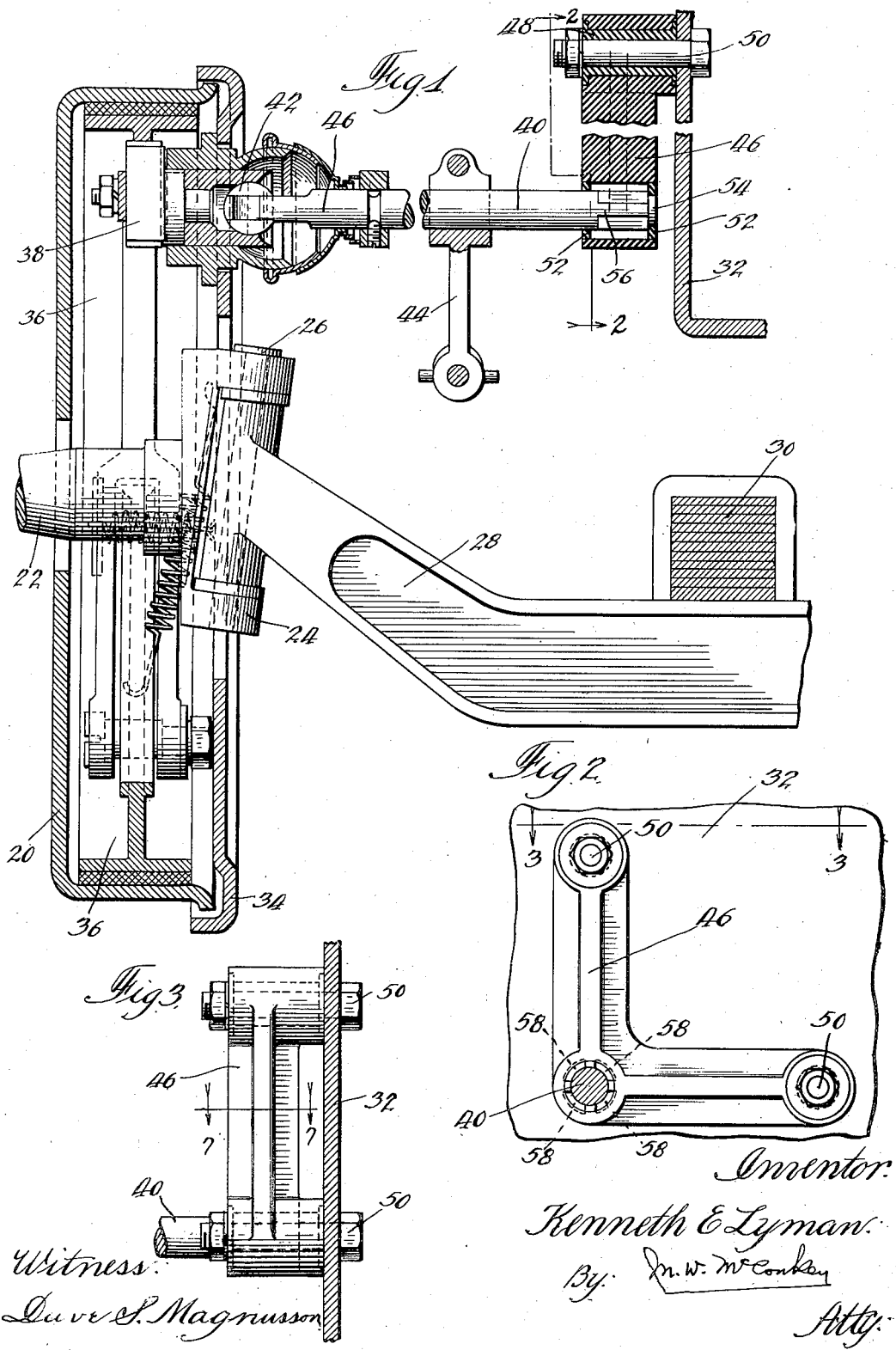

Dec. 20, 1927.
K. E. LYMAN
1,653,112
SHAFT SUPPORT
Filed May 5, 1927
3 Sheets-Sheet 2
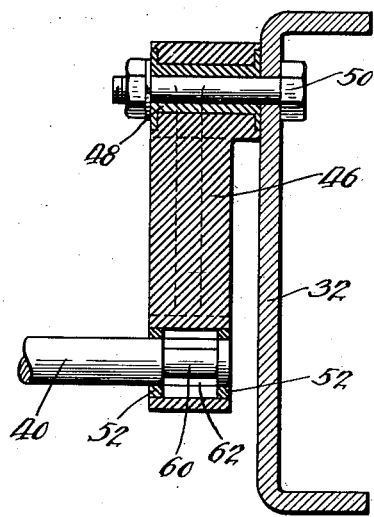
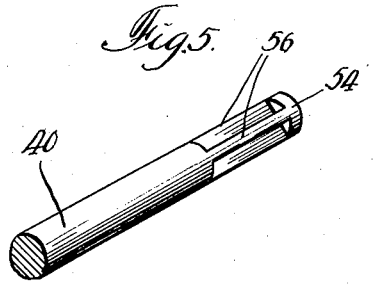
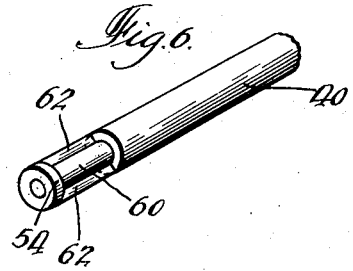
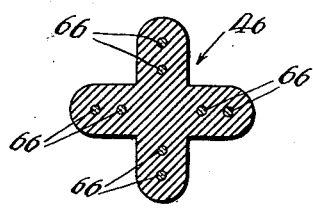
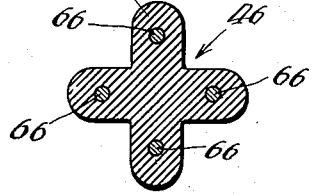
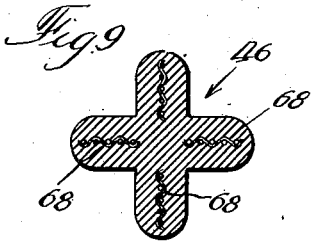
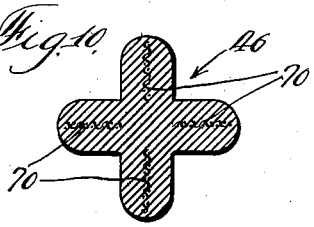
Inventor
Kenneth E. Lyman
By M. W. McConkey
Atty.
Witness.
Dave S. Magnusson.

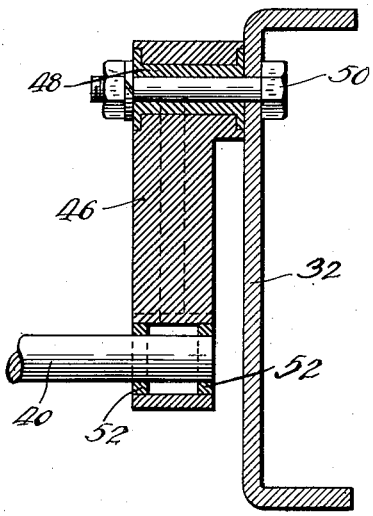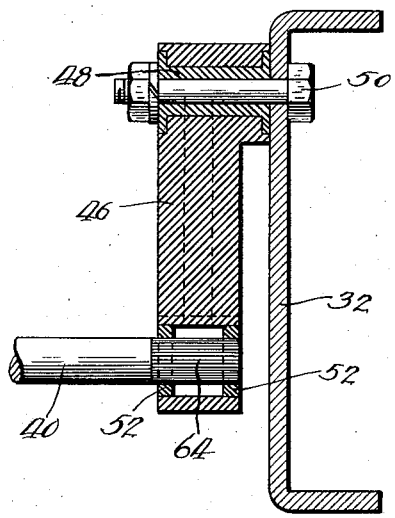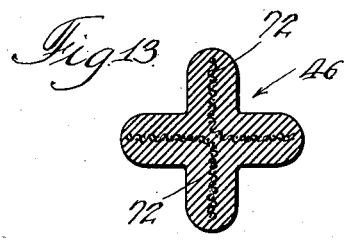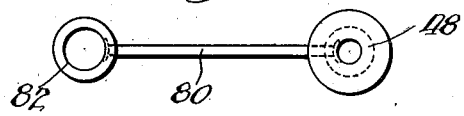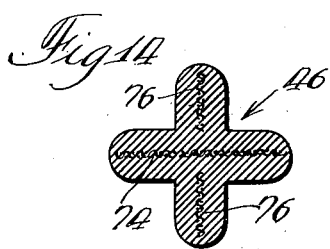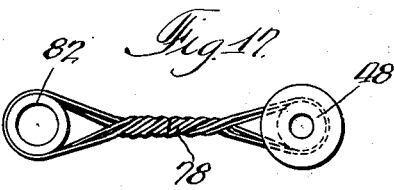

Patented Dec. 20, 1927.

1,653,112

UNITED STATES PATENT OFFICE.

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS.

SHAFT SUPPORT.

Application filed May 5, 1927. Serial No. 188,977.

This invention relates to shaft supports, and is illustrated as embodied in novel supports for the chassis end of the operating shaft of a front-wheel brake. An object of the invention is to provide a flexible support which will compensate for relative movement of the chassis frame and the wheel, and which will not require lubrication.

Preferably the support is L-shaped, the shaft being supported at the apex of the L, and the ends of the two arms being bolted or otherwise secured to the chassis frame. I consider it best to make the support of vulcanized rubber material, and prefer that it be star-shaped in cross-section, so that it will be fairly flexible laterally but almost inextensible lengthwise. If desired, at least the horizontal arm may have embedded therein a core of inextensible material such as fabric or cords or wire.

The above and other objects and features of the invention, including various novel and desirable details of construction, will be apparent from the following description of several illustrative embodiments shown in the accompanying drawings, in which:

Figure 1 is a vertical section through one front brake and through associated parts;

Figure 2 is a section on the line 2—2 of Figure 1, showing the novel shaft support in inside elevation;

Figure 3 is a section looking downwardly in the direction of the arrows 3—3 of Figure 2, and showing the support in top plan;

Figure 4 is a view corresponding to part of Figure 1, but showing a somewhat different shaft support;

Figures 5 and 6 are perspective views of the ends of two different forms of shafts;

Figure 7 is a section through the horizontal arm of the support, on the line 7—7 of Figure 3;

Figures 8, 9, and 10 are sections corresponding to Figure 7, but showing different arrangements of reinforcing material;

Figures 11 and 12 are views corresponding to Figure 4, but showing different means for receiving the end of the shaft;

Figures 13, 14, and 15 are sections corresponding to Figure 7, but showing different arrangements of reinforcing materials;

Figure 16 is a view of one arrangement of fabric reinforcement, before being embedded in the rubber;

Figure 17 is a similar view, but showing a reinforcement of twisted cords or wires; and Figure 18 is a top plan view of the parts shown in side elevation in Figure 17.

The brake shown in Figure 1 includes a drum 20, rotating with a wheel (not shown) on the spindle 22 of a front wheel knuckle 24 swivelled, by a king pin 26 or the like, at one end of a front axle 28. Axle 28 supports, through the usual springs 30, a chassis frame 32.

The open side of the drum 20 is closed by a suitable support such as a backing plate 34 secured in any desired manner to the knuckle 24. The brake proper includes shoes 36 within the drum 20, the shoes being controlled by a cam 38 operated by a shaft 40 acting through a universal joint 42 above the king pin 26. The shaft 40 is shown provided with an operating arm 44.

An important object of the present invention is to provide a novel and inexpensive flexible support for the chassis end of shaft 40, the support preferably being an L-shaped member 46 of vulcanized rubber material supporting the end of shaft 40 at the apex of the L, and having at the ends of its arms means such as bushings 48 for bolts or other fastenings 50 securing the support to the chassis frame 32.

In the arrangement of Figures 1, 2, and 5, washers 52 molded into the apex of member 46 are arranged to be sleeved on the cylindrical portion of shaft 40 and on a flange 54 on the end of the shaft. Four sector-shaped recesses, just before flange 54 is reached, define longitudinal fins 56 on shaft 40, between which project four lugs 58 (Figure 2) molded into the rubber.

In the arrangement of Figures 4 and 6, shaft 40 has a reduced-diameter portion 60 provided, if desired, with a pair of fins 62 received between lugs molded in the rubber as described above. In Figure 11, the washers 52 are a press fit on the end of shaft 40, while in Figure 12 the shaft has a serrated portion 64 on which the washers are pressed.

In all of the illustrated embodiments, the arms of member 46 are star or cross shaped in cross-section (see, for example, Figure 7). This gives a considerable degree of lateral flexibility with a high degree of longitudinal inextensibility.

To increase the longitudinal inextensibility, at least the horizontal arm may be reinforced by cords or wires 66 embedded in the rubber (Figure 7 or Figure 8), or by strips of wire fabric 68 (Figure 9) or of heavy canvas 70 (Figure 10). In Figure 13 there are only two strips 72 of canvas, each folded to reinforce two of the flanges of the star-section. In Figure 14 there is one wide strip 74 extending entirely across, and two narrow strips 76 on opposite sides of, and at right angles to, the strip 74. In Figure 15 the reinforcement consists of twisted cords or wires 78.

Figure 16 shows a single strip 80 of fabric reinforcement extending from the bushing 48 to a bushing 82 corresponding to washers 52 and receiving the end of shaft 40, the parts being shown prior to having the rubber molded about them.

In Figures 17 and 18 are shown the twisted cords or wires 78 of Figure 15, prior to having the rubber molded about them.

While several illustrative embodiments have been described in detail, it is not my intention to limit the scope of the invention to those particular embodiments, or otherwise than by the terms of the appended claims.

I claim:

1. An L-shaped shaft support of vulcanized rubber material formed to support the end of a shaft at the apex of the L and formed to receive supporting fastenings at the ends of its two arms.

2. An L-shaped shaft support of vulcanized rubber material formed to support the end of a shaft at the apex of the L and formed to receive supporting fastenings at the ends of its two arms, at least the horizontal arm being substantially star-shaped in cross-section, to be of minimum extensibility with a minimum of resistance to transverse flexing.

3. An L-shaped shaft support of vulcanized rubber material formed to support the end of a shaft at the apex of the L and formed to receive supporting fastenings at the ends of its two arms, each of the arms being substantially star-shaped in cross-section, to be of minimum extensibility with a minimum of resistance to transverse flexing.

4. An L-shaped shaft support of vulcanized rubber material formed to support the end of a shaft at the apex of the L and formed to receive supporting fastenings at the ends of its two arms, at least the horizontal arm having embedded within its body a core of substantially-inextensible material.

5. An L-shaped shaft support of vulcanized rubber material formed to support the end of a shaft at the apex of the L and formed to receive supporting fastenings at the ends of its two arms, at least the horizontal arm having embedded within its body a core of fabric material.

6. An L-shaped shaft support of vulcanized rubber material formed to support the end of a shaft at the apex of the L and formed to receive supporting fastenings at the ends of its two arms, at least the horizontal arm having embedded within its body a core of twisted cords or wires.

7. A flexible shaft support having a pair of shaft-embracing washers and a plurality of projecting lugs between the washers arranged to enter recesses in the shaft.

In testimony whereof, I have hereunto signed my name.

KENNETH E. LYMAN.